W. H. COOK.
COMBINED NUT AND WASHER.
APPLICATION FILED APR. 23, 1919.

1,350,545.

Patented Aug. 24, 1920.

Inventor.
Walter H. Cook.
By T. Walter Fowler
Atty.

UNITED STATES PATENT OFFICE.

WALTER HERBERT COOK, OF LONDON, ENGLAND.

COMBINED NUT AND WASHER.

1,350,545.  Specification of Letters Patent.  Patented Aug. 24, 1920.

Application filed April 23, 1919. Serial No. 292,032.

*To all whom it may concern:*

Be it known that I, WALTER HERBERT COOK, a subject of the King of England, residing at London, England, have invented certain new and useful Improvements in Combined Nuts and Washers, of which the following is a specification.

This invention relates to an improved combined nut and washer of the type in which the washer is carried by the nut, and has for object to provide in a combined nut and washer, a locking washer of the type having inwardly-directed prongs or teeth adapted to be forced into the thread of the bolt and so to hold the nut which is inseparably engaged with the washer.

According to the present invention, therefore, the washer is provided with inwardly-directed prongs or teeth which enable it to lock itself to the bolt when the prongs are forced into the thread of the bolt so that the washer bites into the bolt, and the nut is thereupon prevented from relatively turning along the screw-threaded bolt (beyond the limits of axial play afforded by the connection between the washer and the nut) by its inseparable connection with and anchorage to the self-fixed washer. The washer having fixed itself to the bolt so that it cannot rotate around the bolt or move axially along the bolt, it follows that the nut cannot rotate along the screw thread beyond the extent of any play existing in the connection between the nut and washer.

Figure 1:
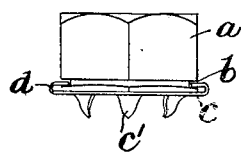
Figure 2:
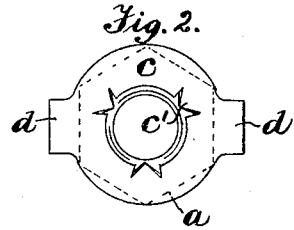
Figure 3:
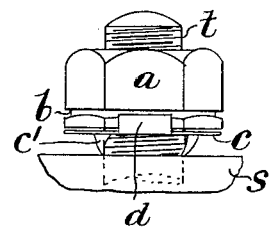
Figure 4:
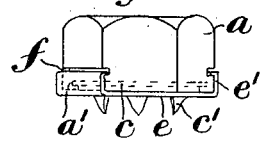
Figure 6:
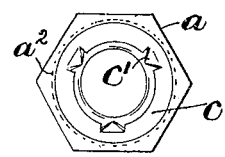
Figure 5:
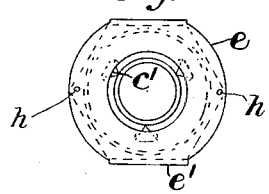
Figure 7:
Figure 9:
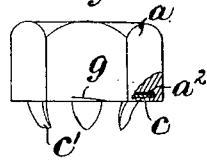
Figure 8:
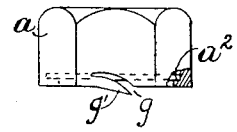
Figure 10:
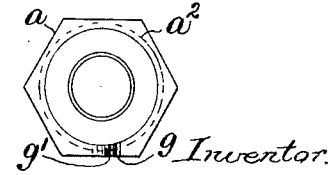

Upon the accompanying drawings, Figure 1 is a side elevation and Fig. 2 a plan from the underside, of a first form of carrying out the invention. Fig. 3 is a side elevation at right angles to Fig. 1, showing the device in position upon a bolt. Figs. 4 and 5 are respectively a side elevation and a plan of the underside of another form of the invention. Figs. 6 and 7 are respectively a plan view of an inverted nut and a sectional elevation of the same, according to a third form of the invention. Figs. 8, 9 and 10 relate to a modification of the latter, Figs. 8 and 10 being respectively an elevation in part section of the nut and an inverted plan of the same, before insertion of the washer, and Fig. 9 an elevation also in part section of the completed nut and washer ready for use.

In Figs. 1-3, the nut $a$ is shown grooved at $b$, this groove extending around the exterior hexagonal faces of the nut. The annular locking washer $c$ is provided with inwardly directed teeth or prongs $c'$ of the well-known fastnut type (see for instance British patent specifications Nos. 13533 of 1904 and 117568 and pending application for U. S. Patent Serial No. 224584) adapted, when the nut is screwed up against a fixed surface $s$, to force the prongs into the thread of the bolt $t$ so that the washer becomes fixed to the bolt, and is also provided with lugs $d$ turned inward to enter the groove $b$. The nut, it will be seen, is normally free to rotate independently of the locking washer $c$ but the latter is held to the nut and advances with the latter by reason of the lugs $d$ engaging the groove $b$. When the locking washer by means of its prongs has fixed itself to the bolt, the nut inseparably connected with the washer will be held against movement upon the bolt within the limits of any play which may exist in the connection ($b$ $d$) between the nut and the washer.

In Figs. 4 and 5, the nut $a$ is recessed at $a'$ and the locking washer $c$ inserted in such recess so that the face of the washer (as distinct from the prongs $c'$) is approximately flush with the bottom of the nut. The washer $c$ is secured in the recess by means of a cover $e$ having lugs $e'$ entering slots $f$ on two opposite faces of the hexagon. If desired, this cover may be pinned to the nut $a$, as shown at $h$, these pins being free from the washer $c$. This cover $e$ rotates with the nut $a$ and it is apertured centrally at $e^2$ to allow the prongs $c'$ of the washer to pass through such aperture. The washer $c$ is normally free to turn in the recess so that when the nut is engaged with the bolt and is being screwed up, the washer $c$ may advance without turning. When, however, the prongs $c'$ have been forced into the screw thread of the bolt, the locking washer becomes fixed to the bolt so that it can move neither around the bolt nor along the bolt, but holds the nut by reason of its connection therewith within the aforementioned limits of axial play.

Figs. 6 and 7 relate to an arrangement in which, as shown in Fig. 7, the locking washer $c$ is convexed before being pressed down and expanded into an undercut recess $a^2$ in the nut. The shoulders of the recess thus hold the washer in place but allow relative turning movement between the nut and washer until the latter becomes fixed to the bolt as in the previous arrangements.

In Figs. 8 and 10 the nut $a$ is undercut and recessed at $a^2$ and an oblique slot $g$ leads from the operative face of the nut to such recess. This slot leaves a horn $g'$ upstanding from the operative face of the nut. Through this slot $g$ a washer $c$ is slipped into the recess. The horn $g'$ may be closed down, as seen in Fig. 9, in any convenient manner after the washer $c$ has been slid into the undercut recess $a^2$ and so as to retain the washer in the recess in the operative face of the nut. For example, when the nut is screwed up to its fixed surface and the operative face of the nut commences to make contact with such fixed surface, the slot $g$ is closed by reason of the horn $g'$ being pressed back into place. If desired two slots $g$ and horns $g'$ may be provided diametrically opposite to one another.

Having thus described my invention, what I claim as such and desire to secure by Letters Patent of the United States of America is:—

1. A combined nut and washer, comprising a nut adapted to be screwed upon a bolt or the like, a washer, means for inseparably securing together said nut and washer while normally allowing their relative rotation, and prongs carried by said washer, said prongs adapted to be forced inwardly to engage the bolt and to anchor the washer to said bolt.

2. A combined nut and washer, comprising a nut adapted to be screwed upon a bolt or the like, a washer, said washer being apertured centrally to clear the bolt but having prongs adapted to be forced inwardly to engage the bolt, thereby fixing the washer to the bolt, and means for securing said washer to said nut, said means normally allowing relative rotation but preventing axial movement.

3. A combined nut and washer, comprising a nut adapted to be screwed upon a bolt or the like, said nut having an annular groove, a washer, means for rotatably connecting said washer to said annular groove, and prongs carried by said washer, said prongs adapted to be forced inwardly to engage the bolt and to anchor said washer thereto.

4. A combined nut and washer, comprising a nut adapted to be screwed upon a screw-threaded bolt or the like, an annular washer, connecting means for inseparably carrying said washer upon said nut, inwardly directed prongs upon the annular washer adapted to be forced into the bolt so that said washer holds the nut to the bolt, said nut being capable of relative turning movement before said prongs are forced into the bolt and the nut thereafter being prevented from involuntary turning, beyond the limit of play in the connecting means between the nut and washer, by its anchorage to the self-fixing washer and the engagement of the latter with the screw threads of the bolt.

5. In a device of the character described, the combination of a nut, said nut being internally screw-threaded to fit its bolt, an annular washer adapted to fit around said bolt and provided with means whereby it may be anchored to said bolt so as to prevent displacement thereon, and an inseparable connection between said nut and annular washer, said connection, however, normally allowing relative rotation between said nut and washer.

In testimony whereof I have affixed my signature in presence of two witnesses.

WALTER HERBERT COOK.

Witnesses:
  VICTOR F. FEENY,
  SAMUEL EVANS.